United States Patent [19]

Ben

[11] Patent Number: 4,861,248

[45] Date of Patent: Aug. 29, 1989

[54] APPARATUS FOR REPAIRING BURIED PIPES

[76] Inventor: Franz J. Ben, Prostewardsweg 27,, 4192 Kalkar-Wissel, Fed. Rep. of Germany

[21] Appl. No.: 153,761

[22] Filed: Feb. 8, 1988

[51] Int. Cl.$^4$ ............................................... B29B 9/00
[52] U.S. Cl. ........................................ 425/13; 249/65; 249/83; 425/62; 138/97
[58] Field of Search ................ 425/11, 12, 90, 13, 425/14, 417, 457, 95, 62, 110, 127, 129 R; 156/94; 264/267, 269, 36; 249/65, 83, 87; 138/97

[56] References Cited

U.S. PATENT DOCUMENTS

| | | | |
|---|---|---|---|
| 782,290 | 2/1905 | Tomkins | 425/13 |
| 3,762,446 | 10/1973 | Tungseth et al. | 138/97 |
| 3,834,421 | 9/1974 | Daley | 138/97 |
| 4,370,113 | 1/1983 | Nakashin | 425/13 |
| 4,643,855 | 2/1987 | Parkes et al. | 264/36 |

FOREIGN PATENT DOCUMENTS 1224256 6/1960 France .
2169983 7/1986 United Kingdom .

Primary Examiner—Bernard Nozick
Attorney, Agent, or Firm—Thomas J. Greer, Jr.

[57] ABSTRACT

There is disclosed apparatus for repairing pipes buried underground such as sewer pipes, comprising a cylindrical packing device which is capable of being inflated by compressed air and has pipes for the supply of sealing material, leading to the outside of the packing device between the inflatable end portions. The packing device has a hose extending over its whole length and made of elastic material such as rubber, which is of smaller wall thickness or greater ability to expand in the region of the two ends, which are closed by means of rigid end pieces, than in its central region.

10 Claims, 2 Drawing Sheets

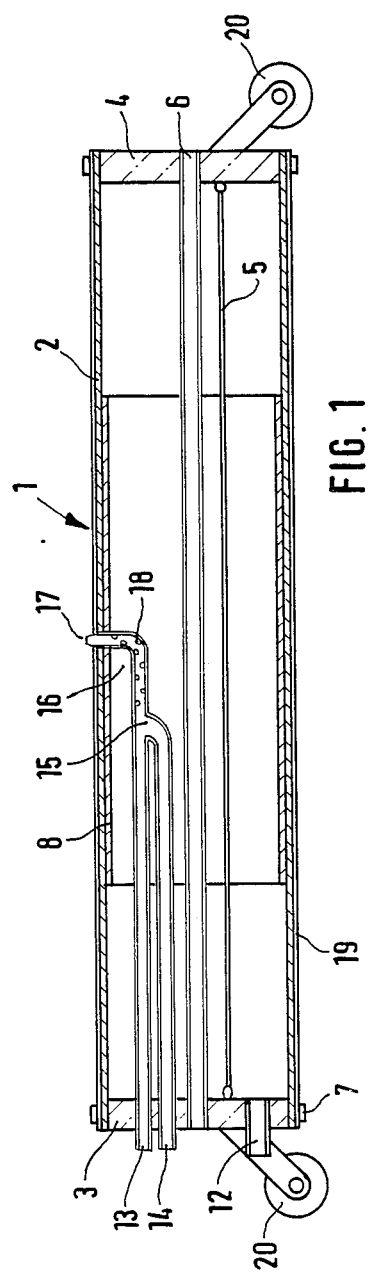
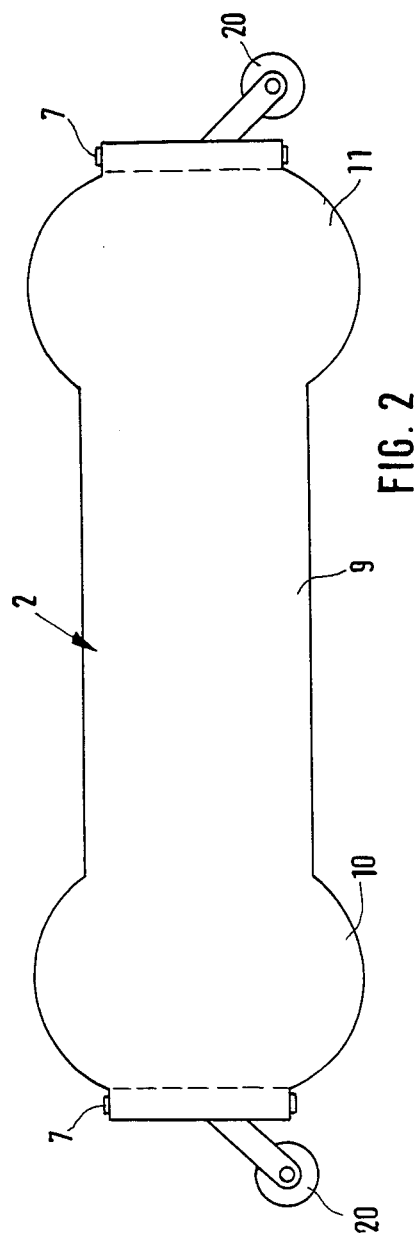

APPARATUS FOR REPAIRING BURIED PIPES

The invention relates to apparatus for repairing pipes which are buried underground, such as sewer pipes, the apparatus comprising a cylindrical packing device which can be inflated with compressed air, together with pipes for feeding in a sealing material and which lead to the outside surface of the packing device point between the inflatable end portions.

Known, apparatus of this kind (DE-PS 2212330) has a rigid cylinder of a diameter which is significantly smaller than the diameter of the pipes to be sealed, on which are arranged mutually spaced apart inflatable bodies which are designed to isolate the region within which the leakage point is to be sealed from the remaining parts of the pipe when they are inflated. However this apparatus is not only expensive in its construction but also has the drawback that in operation a clearance remains between the cylinder and the inner wall of the pipe between the inflated ends, and this clearance can at best be only partially filled with the sealing material, which remains in the repaired pipe after the packing has been removed. Accordingly a relatively large amount of sealing material is required. Actual fractures of pipes cannot be sealed.

Furthermore this known apparatus is relatively complicated and accordingly expensive.

The object of the invention is to provide an economical form of apparatus for repairing pipes buried underground, such as sewer pipes, by which leakages and fractures in the pipes can be rapidly sealed off in such a way that the inside diameter of the pipe is not reduced by the presence of the sealing material and no unnecessary amount of sealing material is used.

This problem is solved according to the invention in that the packing device comprises a hose made of an elastic material such as rubber, having in the region of its two ends, which are closed by means of rigid end pieces, a smaller wall thickness or a greater ability to expand than in its intermediate region. In other words there is proposed according to the invention a packing arrangement which over its entire length comprises a and but which is indeed capable of being inflated and accordingly to be increased in diameter over its whole length but which can be expanded more in its end regions than in its intermediate regions. Accordingly the packing device according to the invention is in a position to achieve the desired sealing between the packing device and the pipe at the ends of the device, but in the central region, namely the faulty region where the points in the pipe which are to be sealed are present, it engages the inner wall of the pipe with only a relatively low pressure so that the sealing material which is fed in can still be introduced and can penetrate into the broken or indeed completely fractured points in the pipe, but is also simultaneously urged around the hose and into the points or fractures or openings which are to be sealed and is held in these until setting has taken place. In this way it is still possible to feed in the packing material between the inflated, and accordingly sealed, ends of the packing device, which material can reach the holes, fractures and the like in the pipe which is to be repaired, but the central portion of the packing arrangement according to the invention achieves the result that this sealing material does not also build up inside the pipe but only flows to the holes, fractures of the like in the pipe to be repaired and is held there until it sets. Accordingly when the sealing material in injected the inside diameter of the pipe is not reduced.

Preferably the hose forming the packing device according to the invention has a smooth non-stick surface so that the material which is forced into the holes, fractures or other opening in the pipe undergoing repair cannot become bonded to the surface of the packing device, but on the contrary allows the packing device to be released from the set mass of sealing material without difficulty.

In a particularly simple and preferred embodiment of the invention the hose of the packing device has its central region a cylindrical insert of likewise plastic or expandable material so that one can limit accurately where the more expandable and the less expandable portions of the packing lie. It is important that the packing should not only have expandable and thereby sealing portions in its end regions, but that it should also be expandable in its central region so that it can in fact take up the clearance cross-section of the pipe which is to be repaired, while still allowing the penetration of the sealing material which is to be fed to the holes, fractures or other openings in the pipe undergoing repair, without the material having to project significantly beyond the inside diameter of the pipe.

The packing according to the invention is therefore constructed in such a way the sealing material can be fed to its central region but because of the central portion of the packing engaging against the inner wall of the pipe with massive pressure the material is forced into the points which are to be sealed and into the ground outside, so that it can harden in the desired sealing position. In this way the problems are overcome of the sealing material reducing the useful cross-section of the pipe under repair and an unnecessarily large quantity of sealing material being used up.

By means of the apparatus according to the invention it is possible not only to fill and thereby seal off with sealing material any holes or fractures in the underground pipes to be repaired, but moreover to repair regions where the pipe has burst outwards because the central portion of the packing according to the invention lies like a shell against the region of the points to be sealed and thereby to be repaired, so the sealing material fed in under pressure matches the original surface shape of the inner wall of the surface to be repaired.

Accordingly, by means of the apparatus according to the invention, it is possible not only to seal off holes or fractures in pipes but also bursts, i.e. points at which pieces of the pipe itself have broken away, because the packing according to the invention not only achieve the desired supply of sealing material but also ensures that this sealing material restores the original shape of the pipe.

The packing according to the invention is furthermore constructed so that a two-component synthetic resin can be employed as the sealing material, of which both components are brought together only directly ahead of the point of repair, i.e. only immediately before emerging from the packing. With this in mind the packing is fitted with two separate pipe connectors for supplying the two components of the sealing material, but ending in a common nozzle. In this way rapid-hardening sealing materials are can be allowed to react, i.e. for example synthetic resins which react together as soon as their two components are broght together. The hardening times in these cases are short and so the packing has to be present at the individual repair points only for relatively short periods. Therefore the repair work can be carried out more rapidly and more economically. On the other hand the danger of blocking the supply pipes by hardening of the sealing material is only slight because the components of the sealing material are only brought together in the immediate neighourhood of the pipe connection leading to the outside of the packing.

Two therefore embodiments of the apparatus according to the invention for repairing underground pipes are illustrated diagrammatically in the drawing by way of example, and in the drawing:

FIG. 1 is a longitudinal section of the apparatus in its rest condition, i.e. non-inflated condition, and FIG. 2 is a side view of the inflated device, but in which no pipe is present, so that the end regions which expand to a greater degree on inflation can be clearly seen.

Figure 3:
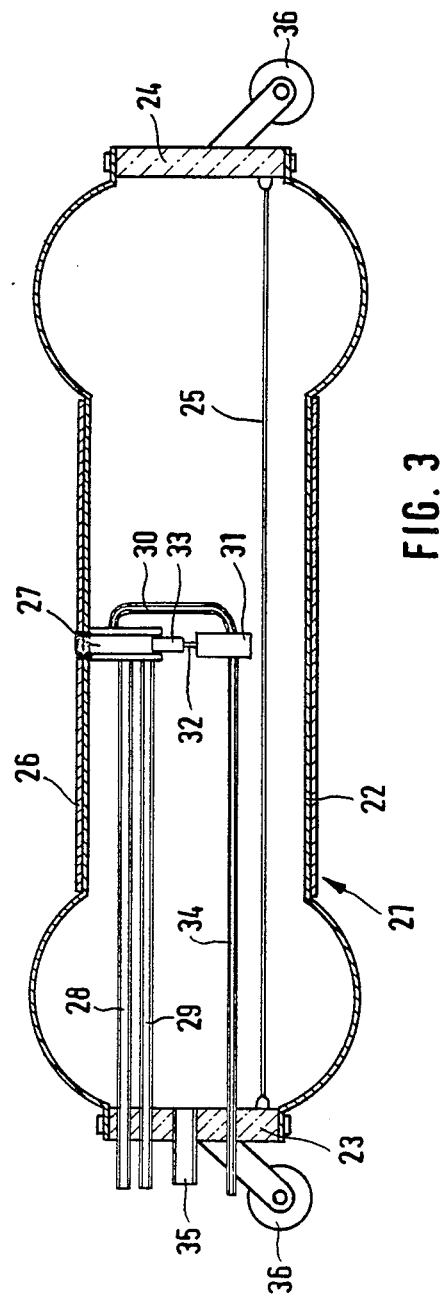
FIG. 3 is a Longitudinal section of another embodiment of the device being inflated but not within a pipe so that the end portions which are more expanded by inflation can be clearly seen.

The apparatus comprises substantially a packing device 1 formed by a cylindrical hose 2 with rigid end caps 3 and 4 inserted in its ends. The hose or tube 2 is capable of being expanded elastically, as further explained below.

The end caps 3 and 4 are connected together by a cable 5 so that their mutual separation is limited. Furthermore between the end caps 3 and 4 there extends a flexible tube or hose 6 which serves to carry a television cable or other leads, not shown.

The cylindrical bag 2 comprises an elastic hose, for example of rubber, in the ends of which are inserted the rigid end caps 3 and 4. A hoop 7 fitted over the outside ensures a durable and tight but releasable clamped connection between the rubber hose which forms the bag 2 and the respective end caps 3 and 4.

Inserted in the central region of the elastic hose forming the bag 2 is a hose portion 8 which is preferably made of the same material as the bag 2 and which is bonded to its inner surface over the entire area and permanently. Accordingly the central portion 9 of the bag 2 has a greater wall thickness than its ends portions 10 and 11 so that the central portion 9 is able to expand to a smaller degree than the end portions 10 and 11 as indicated in FIG. 3. The expansion ratio between the portions 9 on the one hand the 10 and 11 on the other hand are not necessarily shown to scale in FIG. 2. On the contrary, FIG. 2 simply aims to indicate clearly that the bag 2 is able to expand more over its end regions than over its central region when compressed air is introduced into the bag 2 through a hose connection 12 connected to the end cap 3.

In addition two separate mutually parallel pipe connections 13 and 14 are conducted through the end cap 3 into the interior of the bag 2, through which the components of the sealing material to be used for the repair can be introduced separately. The pipe connections 13 and 14 lead to a junction point 15 present in the central region of the bag 2, from which a relatively short length of pipe 16 leads to a nozzle 17 which forms an outlet opening for the sealing material leading to the outside of the bag 2.

The two components of the sealing material which are introduced initially separately through the pipe connections 13 and 14 are mixed together in the region of the pipe section 16 between the connecting point 15 and the nozzle 17 in order to form the two-component sealing material to be used for the repair. Within the pipe section 16 there can be kinks or deflections 18 so that the pipe section 16 acts as a kind of static mixer to ensure good mxing of the two components of the sealing material.

On the outside of the rubber hose which forms the bag 2 there is a foil 19 having a surface which is smooth and which in particular is non-sticking to synthetic resin. This foil prevents any sealing material which emerges from the nozzle 17 from being able to bond itself to the rubber of he bag 2. Accordingly, after hardening of the sealing material injected into holes that are to be repaired in a pipe, the packing device 1 can be removed from the region of the repair without problems, simply in that the bag 2 is deflated by means of the hose connection 12 and the bag collapses elastically and shrinks in diameter.

The packing arrangement illustrated in the drawing can be connected to apparatus capable of being moved along a pipe in a manner not illustrated further, or equally well it can be moved in the usual manner by means of a cable, not shown.

For moving it along, the packing arrangement is provided at its two ends with wheels 20 mounted on the end caps 3 and 4. Moreover the packing device 1, which is only under a low air pressure, can be moved along a pipe to the desired repair point without its surface, and in particular the foil 19, coming into contact with the wall of the pipe.

The packing device 1 is suitable not only for repairing pipes of circular cross-section but also for repairing pipes of other cross sections, for example uniform cross sections or egg shapes.

FIG. 3 is a longitudinal section of another embodiment of the device being inflated but not within a pipe so that the end portions which are more expanded by inflation can be clearly seen.

The packing device (21) shown in FIG. 3 comprises a cylindrical hose (22) of elastically expandable material with rigid ends caps (23 and 24), respectively, inserted in its ends.

The end caps (23 and 24) are connected together by a cable (25) extending within the tube or hose (22) so their mutual separation is limited. Furthermore, a flexible tube or hose as shown in FIG. 1 which serves to carry a television cable or other leads can extend in longitudinal direction through this packing device (21), but such tube or hose is not shown in FIG. 3.

In the central portion of packing device (21) a sleeve (26) is provided on tube or hose (22) which comprises of a substantially non-expandable foil or layer comprising a fabric inlay or ply so that said sleeve surrounds the maximum diameter of the central portion of the inflated packing device. Sleeve (26) is provided with a smooth surface in order that sealing material expelled from the packing device (21) for repairing purposes does not stick to the surface of the packing device.

Also, by means of sleeve (26) the wall thickness of the repaired underground lines or sewers can be adjusted or—in other words—the inner diameter of the repaired pipeline or sewer can be adjusted accordingly.

In the center of the packing device (21) a head member (27) is fixed within hose (22) at the inner side thereof which opens in radial direction to the outer surface or outside of the packing device. Two lines (28 and 29) open into said head element or member (27) through which two components of a mortar mixture can be supplied which components should be expelled as mixture to the outside of the packing device. As those components quickly react with one another they should not come into contact unless immediately before they are expelled or pressed out of the packing device. This is important for mortar mixtures which can be used for repairing of underground pipes, pipelines or sewers since their components begin to react immediately after they came in contact with one another so that the mixture is hardening or curing quickly, and there is little time for expelling the mixture in a fluid or plastic condition.

A pneumatic cylinder (31) is connected to head (27) by means of a bracket (30). Said pneumatic cylinder (31) includes a piston with an extendable piston rod (32). Another piston (33) is connected to the distal end of said piston rod (32) which is slidably moveable within head member (27) in order that all remainders of the mortar mixture can be expelled or removed from the interior of head member (27) as soon as the pressing step for expelling the mortar mixture is terminated. In this manner the curing or hardening of mortar within head member (27) which would block the interior thereof can be avoided. In addition, slidable piston (33) closes the ends of lines (28 and 29) when in its extended position so that mortar components cannot escape from such lines if not desired.

For actuating the pneumatic cylinder (31) compressed air can be supplied through a line (34). This line (34) can be used also for releaving or releasing said cylinder (31) so that a pressure spring provided within said cylinder and not shown in the drawings can return the piston together with its piston rod (32) in its original position as shown in FIG. 3 if cylinder (31) is releaved.

For supplying pressured air into tube or hose (22) a flexible hose (35) is inserted into end cap (23), which hose is connected to a air pressure source not shown which can be used also to supply pressurized air through said line (34).

End caps (23 and 24) which are fixed to hose (22) in a manner as in the embodiment of FIGS. 1 and 2 are provided, similar as shown in FIG. 1 and 2, with wheels (36) which are mounted on end caps (23 and 24) thus that the packing device (21) can be moved on said wheels along a pipe or pipeline to the desired repair point if not inflated without its surface coming into contact the wall or bottom of said pipe or pipeline.

I claim:

1. Apparatus for repairing underground pipes such as sewer pipes, comprising a cylindrical packing device capable of being inflated by compressed air, and pipes for supplying sealing material, said pipes opening through said packing device between its inflatable end portions to the outside of said packing device, wherein said packing device comprises a hose tube made of elastic material over its entire length, said tube having said end portions closed by rigid end pieces, said end portions having a greater ability to expand than the central region of said tube between said portions, an inlet in one end piece for introducing compressed air into the tube to thereby simultaneously expand the end portions of the tube, the central region of said tube carrying a cylindrical insert of elastic maetrial, said packing device containing two separate pipes for sepately supplying the components of a two-component sealing material, said pipes leading to a common outlet radially through the hose of said central region.

2. The apparatus set forth in claim 1, wherein said tube has a smooth nonsticky external surface.

3. The apparatus set forth in claim 1, wherein clamps detachable connect to said end pieces to said tube.

4. The apparatus set forth in claim 1, wherein said rigid end pieces are connected together by means of a flexible element which limits their maximum mutual separation.

5. The apparatus set forth in claim 1, wherein said two pipes lead into a common pipe section designed to act as a mixer.

6. The apparatus set forth in claim 1, wherein said cylindrical insert comprises a substantially non-expandable sleeve which is positioned externally on said expandable tube in the central region of said tube.

7. The apparatus set forth in claim 6, wherein said substantially non-expandable sleeve comprises a flexible and reinforced foil having a nonsticky smooth surface.

8. The apparatus set forth in claim 6, wherein in the center portion of said tube a head member for expelling highly reactive and quickly hardening or curing mortar or resin material radially out of said packing device under pressure is attached to the inner wall of said tube, at least two separate supply lines for pressurized supplying different components for said mortar or resin mass to said head member and which come into contact with one another only within said head member.

9. The apparatus set forth in claim 8, wherein a pressure-actuated piston is slidably movable within a cylindrical interior of said head member for controlled movement between a retracted position in which the ingterior is unobstructed for free passage of the mortar or resin components for pressurized expelling the mortar or resin mixture out of said head member and a forwarded position in which it fills the complete inerior of said head member and sealingly closes off the openings of said separate supply lines.

10. The apparatus set forth in claim 9, wherein said piston is provided at the distal end of the piston rod of a pneumatic pressure cylinder unit attached to said head member within said tube.

* * * * *

UNITED STATES PATENT AND TRADEMARK OFFICE
CERTIFICATE OF CORRECTION

PATENT NO. : 4,861,248
DATED : August 29, 1989
INVENTOR(S) : Franz Janssen

It is certified that error appears in the above-identified patent and that said Letters Patent is hereby corrected as shown below:

On the title page;

[76] Inventor: Franz Janssen, Prostewardsweg 27
4192 Kalkar-Wissel, Fed. Rep. of
Germany Signed and Sealed this Seventeenth Day of July, 1990

Attest:

HARRY F. MANBECK, JR.

Attesting Officer

Commissioner of Patents and Trademarks